United States Patent [19]

Gish

[11] Patent Number: 4,901,961
[45] Date of Patent: Feb. 20, 1990

[54] CARPET ENGAGING SUPPORT DEVICE

[76] Inventor: Donald A. Gish, 3107 Frandoras Cir., Oakley, Calif. 94561

[21] Appl. No.: 112,551

[22] Filed: Oct. 26, 1987

[51] Int. Cl.⁴ .............................................. E04G 3/00
[52] U.S. Cl. ...................................... 248/217.2; 16/8; 24/351; 24/354; 248/503; 411/448; 411/450
[58] Field of Search ............ 248/503, 500, 546, 206.5, 248/216.1, 216.4, 217.2; 24/351, 354, 355, 152, 150 R; 16/4, 8, 6; 411/447, 448, 450, 471; 227/DIG. 1; 224/42.11; 29/432, 432.2

[56] References Cited

U.S. PATENT DOCUMENTS

| | | | |
|---|---|---|---|
| 805,611 | 11/1905 | White, Jr. | 16/4 X |
| 931,023 | 8/1909 | Albertoni et al. | 24/150 R |
| 1,674,598 | 6/1928 | King | 24/152 |
| 2,217,514 | 10/1940 | Henry | 248/500 X |
| 3,190,170 | 6/1965 | Baum et al. | 411/448 |
| 3,981,050 | 9/1976 | Dauphinais | 24/354 |

FOREIGN PATENT DOCUMENTS 275238 10/1927 United Kingdom ................ 411/447

Primary Examiner—Ramon S. Britts
Assistant Examiner—David L. Talbott
Attorney, Agent, or Firm—Melvin R. Stidham

[57] ABSTRACT

Carpet engaging support devices for anchoring tippable or slidable objects in desired position on a carpeted floor, the devices having one or more sharpened prongs engagable through and under the carpet, with the prongs being arranged to hold the devices on the carpet against unwanted removal. Spring clips, detent means and magnetic means are provided for releasably securing the devices to the objects to be anchored. In one aspect of the invention, the devices are particularly suited for anchoring a receptacle balanced on top of a carpeted floor hump in an automobile, while in other aspects the devices are particularly suited for anchoring mats, throw rugs and the like.

9 Claims, 3 Drawing Sheets

CARPET ENGAGING SUPPORT DEVICE

BACKGROUND OF THE INVENTION

Field of the Invention

1. This invention relates to devices for securing objects placed on carpets against unwanted movement, and more particularly to devices for anchoring receptacles supported on the carpeted hump of an automobile floor against inadvertently being tipped over.

2. Description of the Prior Art

Various devices have been proposed for holding various objects in desired position on a carpeted surface. It is often desirable to anchor items such as receptacles, floor mats, flower pots, waste baskets and the like against lateral displacement and against being tipped sufficiently to spill out contents. Such objects are often struck accidental blows by the feet of nearby persons and, where carried on the carpeted floor of a vehicle such as an automobile, are subject to various lateral forces caused by bouncing and swaying of the vehicle as it passes over the road surface.

In the case of automobiles, it is known to provide open receptacles, sometimes called "caddys", formed for receiving litter, trash and the like and confining same within the receptacle until it can be emptied. Often, such receptacles are also provided with cylindrical wells capable of holding open cans, cups and bottles of soft drinks. At times, a flat cover is provided on the receptacle which can serve as a writing desk or as an aid in supporting maps while the route to be followed by the vehicle is traced upon them.

In most automobiles, the floors are formed with a central hump running longitudinally of the automobile, the hump being necessary for housing drive shafts and other working parts of the automobile. It has been found to be convenient to mount receptacles atop these humps and large numbers of such receptacles are presently on the market. Typically, these receptacles have curved undersides conforming to the curvature of the hump and are balanced on the hump. Efforts are made to stabilize these receptacles and keep them from slipping on the carpeted hump by providing laterally extending flexible, weighted flaps which extend to opposite sides of the hump.

The conventional hump-mounted receptacles are not directly attached to the carpeting on the hump, nor to anything else, and hence these receptacles are prone to be tipped over at inopportune times either by being kicked or by reason of movements of the automobile.

Some attempts have been made to attach permanent fasteners to the metal floor of the automobile, with the receptacle having straps which can be hooked to such fasteners. These fasteners are conspicuous and unsightly, particularly when the receptacle is removed and not in use. Other attempts have been made to utilize hook and eye fabric strips of the type commonly known as "Velcro". These devices also require that a fastening element be permanently mounted on the carpet where it is conspicuous and unsightly when the receptacle is not in use. Moreover, the typical Velcro fastener does not have sufficient attaching strength, in reasonable sizes, to anchor the receptacle securely.

Another problem encountered with carpeted automobiles is how to hold or anchor in place the rubber or plastic carpet protective floor mats often used during inclement weather. These mats have a tendency to slide around on the carpet, creating a hazard to people getting in and out of the automobile and tending to cause the floor mats to buckle and tear. Similar problems, although in lesser degree, are encountered in anchoring floor mats, runners or throw rugs at desired places in the home.

Previous attempts to anchor such items against unwanted lateral movement on a carpet suffer from the same problems as those described in connection with anchoring a receptacle to the hump on the floor of an automobile.

SUMMARY OF THE INVENTION

The present invention provides carpet engaging support devices mountable on the carpet wherever desired and formed for securely gripping the carpet to anchor the device against movement relative thereto, the devices being provided with mounting means formed for releasable attachment to the object to be supported against unwanted movement on the carpet.

The body of each device is preferably flattened and is provided with one or more elongated prongs secured to the underside of the body and terminating in a sharp point capable of penetrating through carpeting material. The prong is formed to extend below the body for hooking under the carpet and removably securing the body thereto.

In a preferred form of the invention, a plurality of prongs are provided, and these prongs are stiffly bendable so that forcing of the body downwardly against the carpet causing bending of the prongs so they lie substantially parallel to the body with the carpet gripped between the prongs and the body.

In one form of the invention, a pair of the described prongs is attached in generally parallel spaced relation to the underside of the body near one end thereof, with the main reach of the prongs extending in parallel spaced relation under the body for gripping the carpet therebetween when the body is forced or hammered down against the floor. A second, smaller pair of prongs extends from the underside of the body at substantially right angles thereto and is formed so that, as the body is mashed down against the floor, the smaller set of prongs is bent to lie substantially parallel to the body with the carpet gripped between the prongs and the body. Since the first and second pairs of prongs point in opposite directions, the body is securely held against withdrawal from the carpet.

The described devices are quite small and inconspicuous when left in place, and, if it is desired to remove them, the small set of prongs can be clipped from the body and the longer pair of prongs withdrawn from underneath the carpet.

The means for mounting the object to be supported on the device of the present invention consists, in one form of the invention, of a flattened spring clip into which objects such as the laterally extending flaps on automobile hump receptacles can be removably engaged. When it is desired to remove the receptacle, as for dumping and/or cleaning, the flaps can be pulled out of the spring clips and then easily reinserted.

In another form of the invention, a single prong is mounted on the underside of a flattened body and spirals downwardly therefrom to terminate in a sharpened point. To install this form of the device, the body is rotated around the axis of the spiral so the prong screws down through the carpet somewhat in the manner of a corkscrew. When it is desired to remove the device, it is simply unscrewed.

Another form of mounting means for removably attaching the anchoring device of the present invention to the object to be anchored consists of flattened magnet and a magnetically attractable flattened keeper attached to the body of the anchoring device and to the object to be anchored. The configuration is such that lateral relative movement between the magnet and keeper is precluded, so that the object being anchored cannot slip sideways.

It is therefore a principal object of the present invention to provide carpet engaging support devices which are securable directly to the underlying carpet and releasably securable to the object to the anchored in place on the carpet.

Another object of the present invention is to provide carpet engaging supporting devices of the character described which require no separate parts or tools for achieving firm securing of the device to the underlying carpet.

A further object of the present invention is to provide a carpet engaging support device of the character set forth which requires no modifications to the structure of the floor underlying the carpet.

A still further object of the present invention is to provide a carpet engaging support device which can easily and conveniently be located at any desired position on the carpet, and which is easily and readily installable with the bare hands of the person doing the installation, or at most the heel of such person's shoe.

Other objects and features of advantage will become apparent as the specification progresses and from the claims.

Figure 1:
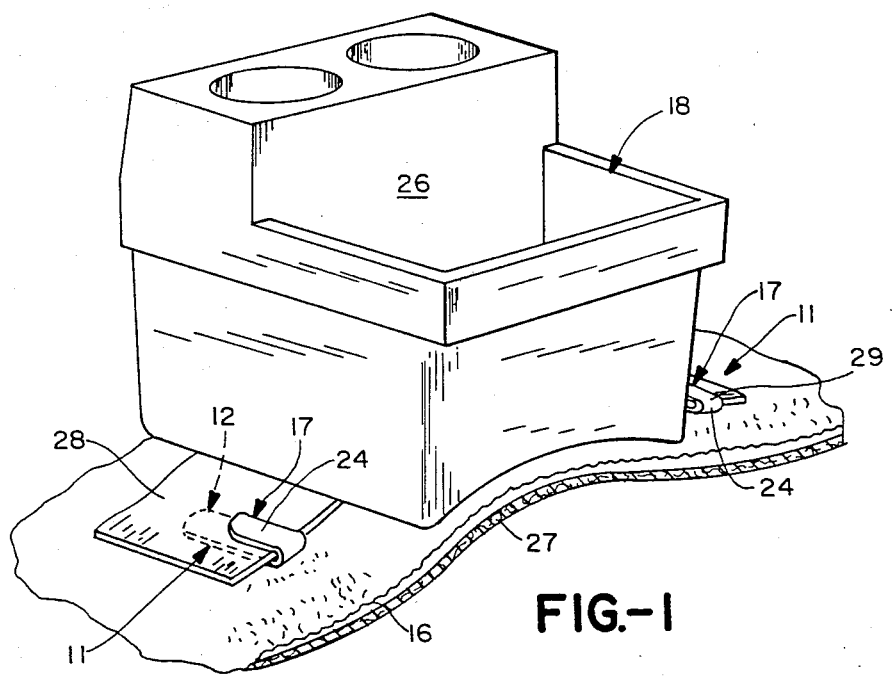
FIG. 1 is a perspective view of a pair of carpet engaging support devices constructed in accordance with the present invention and shown in operating position to anchor a receptacle the top of a carpeted floor hump in an automobile.

While only the preferred forms of the invention are illustrated in the drawings, it will be apparent that various modifications could be made without departing from the ambit of the claims.

DESCRIPTION OF THE PREFERRED EMBODIMENTS

As may be seen in the accompanying drawings, the carpet engaging support devices 11 of the present invention provide a body 12 having an elongated prong 13 secured to the body 12 and terminating in a sharp point 14 capable of penetrating a carpet 16, the prong 13 being formed to extend below the body 12 for hooking under the carpet 16 and removably securing the body 12 thereto, together with mounting means 17 on the body 12 formed for securing thereto an object 18 to be anchored in place.

Preferably, the body 12 is substantially flattened, and the mounting means 17 is on the upper side of the body 12, that is, on the side 19 opposite to the prong 14, which preferably is positioned on the underside 21 of the body 12. In the forms of the invention illustrated in FIGS. 1 through 6 and 10 through 13, a plurality of prongs 13 are provided, and these prongs are made of stiffly bendable material configured so that forcing of the body 12 downwardly against the carpet 16 causes bending of the prongs 13 sufficiently for them to lie substantially parallel to the underside 21 of the body 12 with the carpet 16 gripped between the prongs 13 and the body 12.

Figure 3:
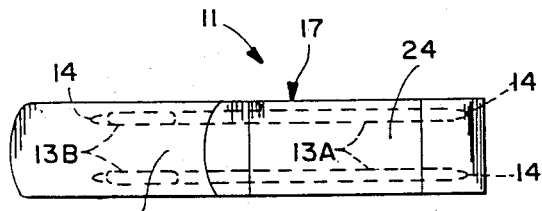
FIG. 3 is a plan view on an enlarged scale of one of the carpet engaging support devices of FIGS. 1 and 2.

In this form of the invention, the body 12 is elongated and a pair of the prongs 13 is attached to the underside 21 of the body 12 in generally parallel spaced relation, see FIG. 3 of the drawings. This pair of the prongs 13, designated 13A, is attached to the underside 21 of body 12 near one end thereof and extends under the main portion 22 of the body 12 for gripping the carpet 16 between the prongs 13A and the body 12. Retaining means 23 is provided on the body 12 and is formed for engaging the carpet 16 and preventing withdrawal of the pair of prongs 13A from beneath the carpet 16.

As shown in FIGS. 1 through 6 of the drawings, the retaining means 23 comprises a prong or pair of prongs 13B secured to the underside 21 of body 12 and extending downwardly therefrom, the prongs 13B also having sharpened ends 14 formed for passing through the carpet 16 and being bent back in a direction opposite to the direction of the main pair of prongs 13A so as to prevent the prongs 13A from being pulled from under the carpet 16.

In the forms of the invention illustrated in FIGS. 1 through 7 and 10 through 12 of the drawings, the mounting means 17 is in the form of a flattened spring clip secured to the upper side 19 of body 12. Conveniently, the body 12 is made of flat spring stock having an elongated end bent back on itself to provide an integral spring clip 24, as illustrated in FIGS. 1 through 6, 10 and 11 of the drawings. In the forms of the invention illustrated in FIGS. and 12 of the drawings, the body 12 is of disc shape, and the spring clip 24A is fabricated separately and securely attached to the upper side 19 of the body 12 as by welding or brazing.

Figure 2:
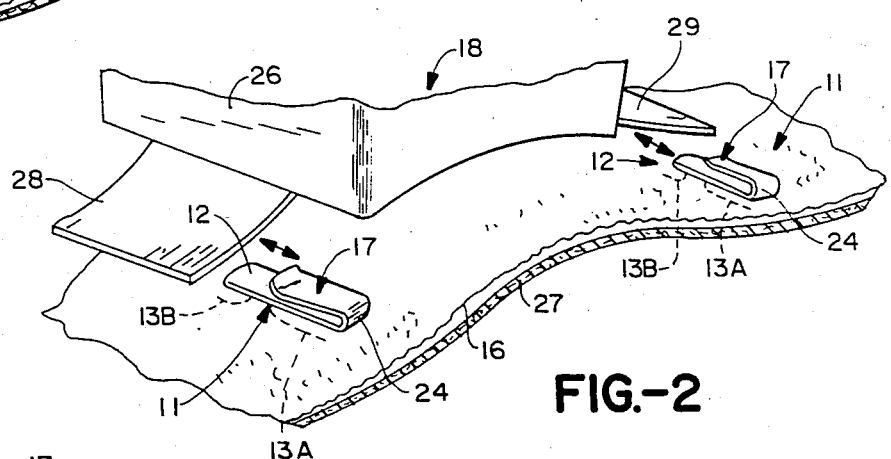
FIG. 2 is a fragmentary exploded view taken similarly to that of FIG. 1 but showing the object being anchored in position for installing in or removal from the support devices of the present invention.
Figure 10:
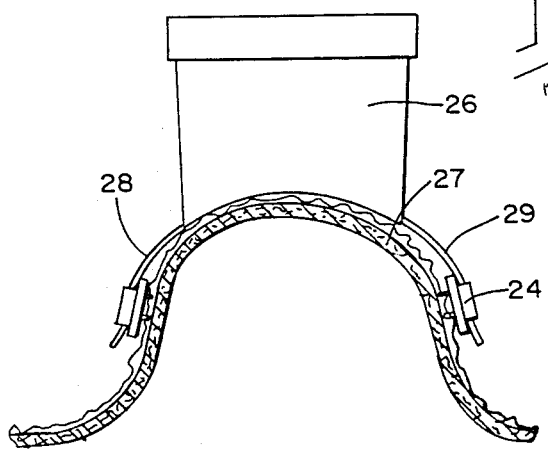
FIG. 10 is a vertical cross sectional view of a receptacle mounted on an automobile floor hump of sharper curvature than shown in FIG. 1, with the carpet engaging support devices of the invention being used for anchoring the receptacle in position.

In the form of the invention illustrated in FIGS. 1, 2 and 10 of the drawings, a pair of the said carpet engaging support members 11 are provided for use with a receptacle formed for removable mounting on a carpeted automobile floor hump 27. The receptacle 26 is provided with flexible, laterally extending skirts 28 and 29, and the carpet engaging support members 11 are mountable on the carpet 16 on opposite sides of the receptacle 26 in position for receiving and releasably gripping the skirts 28 and 29 so as to releasably hold the receptacle in desired position on the hump 27.

Figure 7:
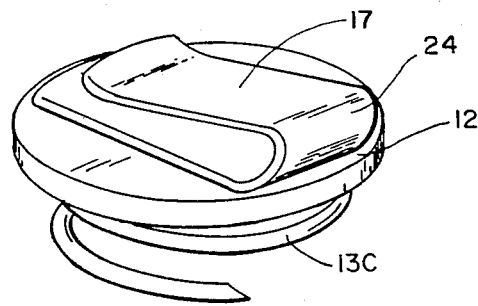
FIG. 7 is a modified form of the invention utilizing a spiral prong and a flattened spring clip.
Figure 9:
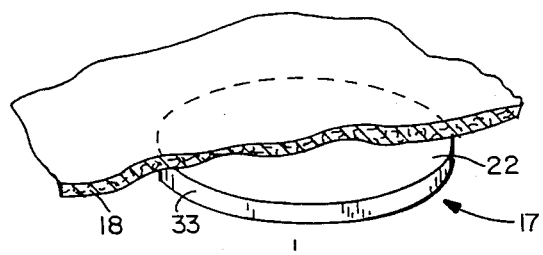
FIG. 9 is an exploded perspective view of a device similar to that of FIG. 7, but utilizing a magnet and keeper for removably securing an object to be anchored to the device, portions of the object being broken away and shown in section to conserve space.
Figure 9:
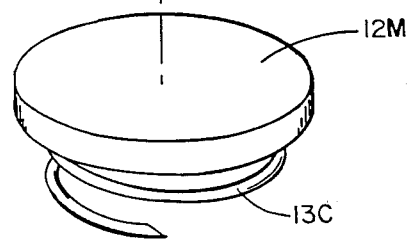
Figure 8:
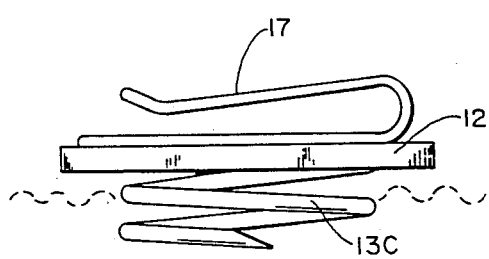
FIG. 8 is a side elevational view of the device of FIG. 7.
Figure 11:
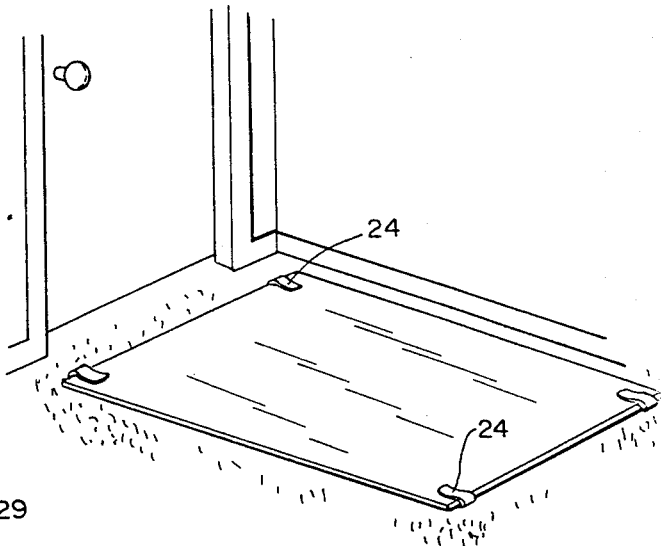
FIG. 11 is a perspective view of a floor mat in a house anchored in place by carpet engaging support devices of the present invention.

In the form of the invention illustrated in FIGS. 7 through 9 of the drawings, a single prong 13C is in spiral form adapted for screwing through the carpet 16 upon rotation of the body 12 about the axis 31 of the spiral prong 13C. In this form of the invention, the body 12 is preferably of flattened disc shape.

In the form of the invention illustrated in FIG. 9 of the drawings, the mounting means 17 is a detent means provided by a flattened disc shaped member secured to the object 18 to be anchored and formed to fit tightly over the disc shaped body 12. The detent effect is provided by the engagement between the peripheral downwardly extending wall 33 on disc 22 and the periphery of the disc shaped body 12.

Firmer retention of the disc shaped member 33 on the disc shaped body 12 may be provided by providing the mounting means 17 in the form of a magnet and keeper mounted on the body 12 and disc 32. As shown in FIG. 9 of the drawings, the body 12M is made of magnetic material and the disc 33 is made of magnetically responsive material to provide the keeper. Obviously, the positions of the magnet and keeper could be reversed.

Figure 12:
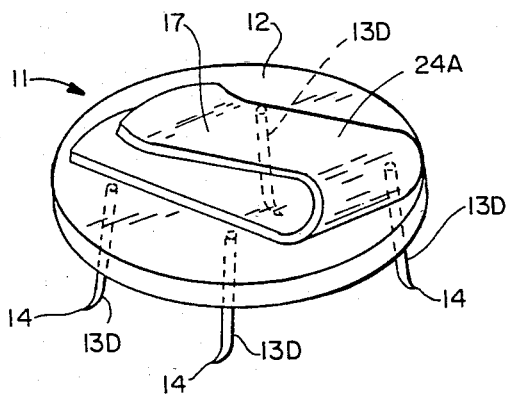
FIG. 12 is a perspective view of another form of the invention utilizing a plurality of outwardly diverging prongs and having a spring clip mounting means thereon.
Figure 13:
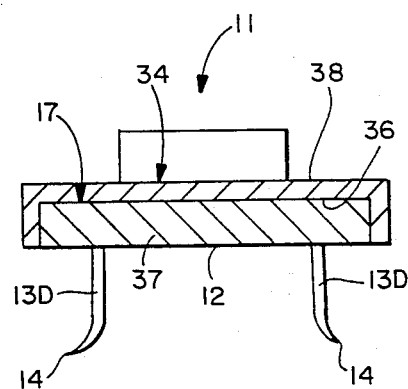
FIG. 13 is a vertical cross sectional view through a device having diverging prongs similar to those of FIG. 12, but utilizing a magnet and keeper mounting means.
Figure 14:
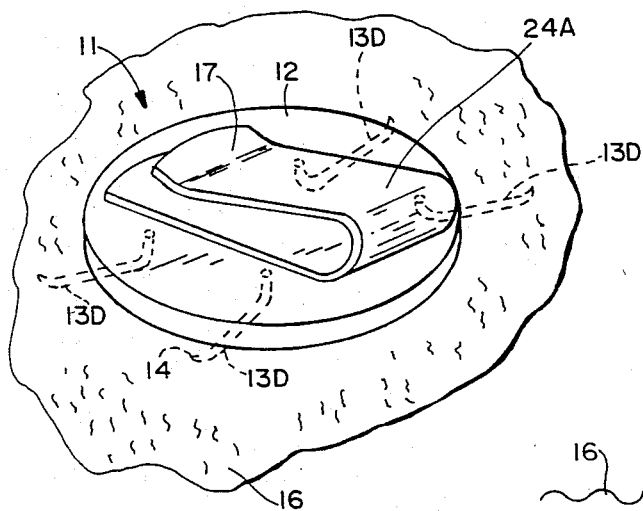
FIG. 14 is a perspective view of the device of FIG. 12 in installed position.
Figure 15:
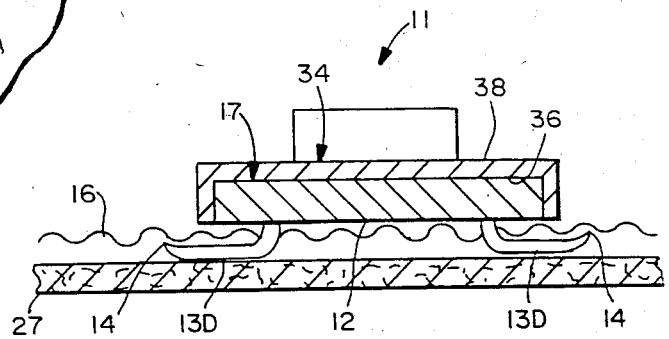
FIG. 15 is a vertical cross-sectional view of the device of FIG. 13 in installed position.

In the form of the invention illustrated in FIGS. 12 and 13 of the drawings, a plurality of prongs 13D are provided and pairs of these prongs are formed to bend in opposite directions when the body 12 is pressed downwardly against the carpet 16. Thus, a plurality of downwardly extending prongs are secured at angular intervals to the underside 21 of the body 12. These prongs 13D are sharpened and are bent slightly radially outwardly so that, when the body 12 is pressed or pounded down on the carpet, the prongs 13D will penetrate the carpet and will then be bent outwardly and upwardly until they grip the carpet between the prongs 13D and the body.

As illustrated in FIG. 13, the body 12 is of generally disc shape and an attachment member 34 is secured to the object 18 to be anchored. The attachment member 34 is formed with a downwardly opening concavity formed to mate with the body 12, the concavity 36 and body 12 providing detent means for releasably holding the body 12 in place in the downwardly opening concavity.

As described in connection with FIG. 9 of the drawings, magnet means having a magnetic element 37 and a keeper element 38 mounted on the body 12 and attachment member 34 may be provided for holding the body 12 and attachment member 34 more firmly together. In this connection, it should be noted that the concavity 36 prevents relative lateral movement between the magnetic element and the keeper element, thus firmly anchoring the object 18 in place.

From the foregoing, it will be apparent that the carpet engaging support devices of the present invention provide a novel and highly advantageous way of anchoring tippable or slidable objects in place on a carpet without damage to the carpet and without requiring structural modifications to the floor beneath the carpet, while at the same time providing for easy and simple removal and replacement of the object being anchored. These characteristics are particularly advantageous in connection with anchoring receptacles or caddys balanced on top of floor humps in automobiles.

Figure 5:
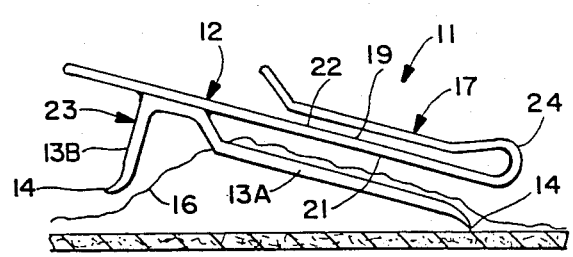
FIG. 5 is a view similar to that of FIG. 4 but showing the device being installed in a carpet.
Figure 4:
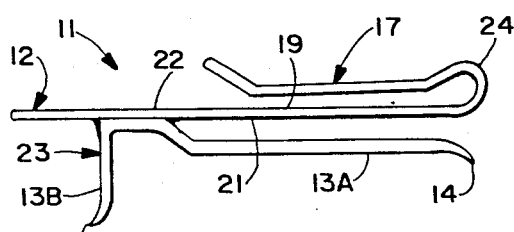
FIG. 4 is a side elevational view of the device of FIG. 3.
Figure 6:
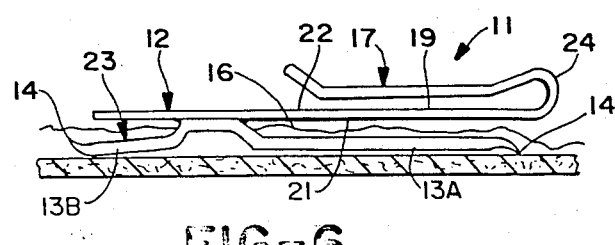
FIG. 6 is a view similar to that of FIG. 5, but showing the device in its installed position.

While there have been illustrated and described several types of mounting means, each with a type of carpet engaging support devices, it is clear that they can be intermixed so that for example, a magnet means or other type of holding means may be employed with the opposing pairs of bendable, sharp prongs shown, for example, in FIGS. 4 to 6.

What is claimed is:

1. A carpet engaging support device comprising a body,
    first and second pairs of elongated prong means rigidly fixed to the underside of said body, each of said prong means terminating in a sharp point capable of penetrating a carpet,
    said prong means being formed to extend below said body for hooking under said carpet and removably securing said body thereto,
    one of said pairs of prong means extending initially at a slight angle to parallel to said body in one direction from points of merger with said body, to penetrate the carpet so that the carpet is disposed between said prongs and said body;
    the other pair of said prong means initially extending downward from said body and substantially perpendicular thereto with the tips thereof extending slightly in the direction opposite to said one direction, and being bendable so that driving said body downwardly against said carpet with said initially downward extending prong means substantially fully penetrating said carpet and engaging a hard, impenetrable carpet supporting surface bends said other pair of prong means below said carpet in said opposite direction to a position generally parallel to said body to lock said pairs of prong means against withdrawal from said carpet; and
    mounting means fixed on the upper side of said body formed for securing an object thereto.

2. A carpet engaging device as described in claim 1, and wherein said mounting means comprises a flattened spring clip secured to the upper side of said body.

3. A carpet engaging device as described in claim 2, and wherein said body is bent back on itself to provide an integral spring clip.

4. A carpet engaging device as described in claim 2, and wherein a pair of said carpet engaging support devices are provided for use with a receptacle formed for removeable mounting on a carpeted automobile floor hump and having flexible laterally extending skirts, and carpet engaging support devices being mountable on said carpet on opposite sides of said receptacle and positioned for receiving and releaseably gripping said skirts so as to releaseably hold said receptacle in desired position on said hump.

5. A carpet engaging device as described in claim and wherein said mounting means comprises a magnet and keeper mounted on said body and on an object to be supported.

6. A carpet engaging device as described in claim 1, and wherein said body is of generally disk shape, and an attachment member is provided having a downwardly opening concavity formed to mate with said body and adapted for securing to an object to be supported.

7. A carpet engaging device as described in claim 6, and wherein said body is releasably held in place in said downwardly opening concavity by detent means on said body and said attachment member.

8. A carpet engaging device as described in claim 6, and wherein said body is releasably held in place in said downwardly opening concavity by magnet means having a magnetic element and a keeper element on said body and said attachment member.

9. In combination with a receptacle adopted to be removably carried on an automobile floor hump and having laterally extending flexible skirts comformable to the contours of such hump, carpet engaging support devices mounted at opposite sides of such hump with each of said support devices comprising an elongated flattened body, first and second pairs of elongated prongs rigidly fixed to said body to extend downwardly therefrom, said first pair of elongated prongs being secured to said body and extending in one direction at a slight angle to parallel to it length, said second pair of elongated prongs being secured to said body and extending substantially perpendicular thereto with the tips thereof extending slightly in the direction opposite to said one direction, each of said prongs terminating in a sharp point capable of penetrating through a carpet on the floor of said automobile, each of said prongs being stiffly bendable whereby forcing of said prongs against said carpet causes such prongs to penetrate through such carpet and further downward forcing of said prongs against the floor of said automobile causes same to bend and extend under said carpet in opposite directions and grip said carpet between said prongs and said body and lock said prongs against removal from said carpet, and a flattened spring clip mounted on the side of said body remote from said prongs and formed for releasably grasping one of said flexible skirts for stabilizing the position of said receptacle on said floor hump.

* * * * *